United States Patent [19]

Burzynski

[11] Patent Number: 4,984,703
[45] Date of Patent: Jan. 15, 1991

[54] PLASTIC CLOSURE WITH COMPRESSION MOLDED SEALING LINER

[75] Inventor: Dennis J. Burzynski, Toledo, Ohio

[73] Assignee: Owens-Illinois Closure Inc., Toledo, Ohio

[21] Appl. No.: 416,620

[22] Filed: Oct. 3, 1989

[51] Int. Cl.⁵ .............................................. B65D 53/00
[52] U.S. Cl. ................................... 215/350; 215/349
[58] Field of Search ............... 215/341, 348, 349, 350, 215/351

[56] References Cited

U.S. PATENT DOCUMENTS

| | | | |
|---|---|---|---|
| 2,072,536 | 3/1937 | Trickey | 215/38 |
| 2,131,319 | 9/1938 | Greenholtz | 18/30 |
| 3,210,805 | 10/1965 | Hanai | 18/20 |
| 3,866,845 | 2/1975 | Keeler | 215/341 |
| 4,232,086 | 11/1980 | Mori et al. | 215/328 X |
| 4,253,580 | 3/1981 | Doi et al. | 215/230 X |
| 4,343,754 | 8/1982 | Wilde | 264/154 |
| 4,390,552 | 6/1983 | Niwa | 215/349 X |
| 4,418,828 | 12/1983 | Wilde | 215/252 |
| 4,497,765 | 2/1985 | Wilde et al. | 215/252 X |
| 4,522,856 | 6/1985 | Paisley et al. | 215/348 X |
| 4,721,221 | 1/1988 | Barriac | 215/350 |
| 4,807,772 | 2/1989 | Schloss | 215/349 |
| 4,845,362 | 7/1989 | Schloss | 215/349 |

Primary Examiner—Stephen Marcus
Assistant Examiner—Nova Stucker

[57] ABSTRACT

A plastic closure comprising a base wall, a peripheral skirt, means on said skirt adapted to attach the closure to a container, and a sealing liner compression molded in situ on the interior of the base wall of the closure, said sealing liner comprising a blend of an ethylene vinyl acetate composition and a thermoplastic elastomeric composition.

7 Claims, 1 Drawing Sheet

PLASTIC CLOSURE WITH COMPRESSION MOLDED SEALING LINER

This invention relates to compression molded plastic closures and particular compression molded plastic closures having compression molded liners therein

BACKGROUND AND SUMMARY OF THE INVENTION

Plastic closures have been commonly made by injection molding or compression molding In plastic closures made by compression molding as shown, for example, in U.S. Pat. Nos. 3,210,805, 4,434,754, and 4,418,828, incorporated herein by reference, it is also common to compression mold a sealing liner in place in the closure after the closure has been formed. Such sealing liners may comprise polyvinyl chloride plastic or thermoplastic elastomeric compositions. Polyvinyl chloride has a tendency to overheat during extrusion and further has inherent problems because of the removal torque when the sealing liner is used on a PET container. Thermoplastic polymeric compositions are more expensive, more difficult to produce in that the compounding necessary results in inconsistent quality and consistency. Furthermore, such compositions produce problems of torque removal on glass containers. U.S. Pat. Nos. 4,807,772 and 4,846,362 disclose a compression molded liner being made of a blend of polyethylene or polypropylene and thermoplastic elastomeric copolymer so that the liner is removable.

As a result of the problems with both types of compositions, it has been necessary for a user to maintain costly inventories of closures with both types of sealing liners in order to accommodate use with both plastic and glass containers.

In order to produce a satisfactory sealing liner that would be applicable to both plastic and glass containers, it must be necessary to not only formulate the composition but also consistently extrude and cut off charges of the composition for compression molding in apparatus such as shown, for example, in U.S. Pat. Nos. 3,955,605, 4,080,136 and 4,277,431. The closure must also match other closure requirements including satisfactory removal torques, carbonation retention, carbonation retention under top load and satisfactory functioning on a container when cycled through environmental changes of temperature and humidity.

Accordingly, among the objectives of the present invention are to provide a compression molded plastic closure having a compression molded sealing liner which will overcome the problems inherent in the prior sealing liners; which will operate satisfactorily on both plastic and glass containers; which is relatively lower in cost; and which can be readily processed and meet the requirements for a satisfactory closure.

DESCRIPTION

Figure 1:
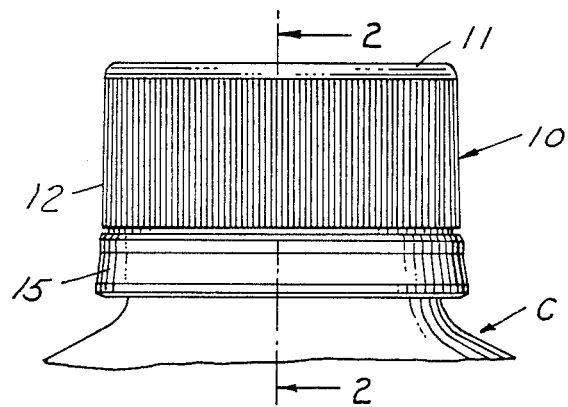
FIG. 1 is an elevational view of a closure embodying the invention.
Figure 2:
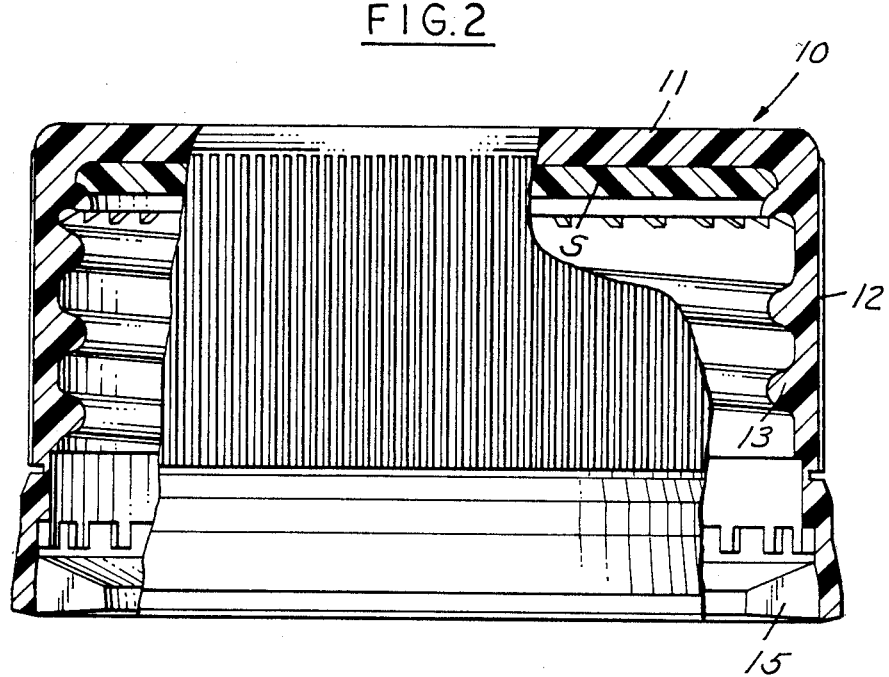
FIG. 2 is a sectional view of the closure embodying the invention.

Referring to FIGS. 1 and 2, the plastic closure 10 of suitable material such as polypropylene embodying the invention comprises a base wall 11, a peripheral skirt 12 having internal threads 13 for engagement with complementary threads on a container C and a sealing liner S in the form of an annular shape at the juncture of the base wall 11 and peripheral skirt 12. The closure may include tamper indicating means 15 such as shown, for example, in U.S. Pat. Nos. 4,418,828, 4,613,052 and 4,653,657.

In accordance with the invention, the sealing liner comprises a composition of a blend of ethylene vinyl acetate composition and a thermoplastic elastomeric composition.

The ethylene vinyl acetate composition comprises polyethylene as the major constituent and vinyl acetate and optionally includes antioxidants and pigments The thermoplastic elastomeric composition preferably comprises polypropylene or polyolefin as a major constituent and styrene-butadiene-styrene and optionally includes antioxidants and pigments.

The ethylene vinyl acetate composition may have the composition within about the following ranges, by weight:

| | |
|---|---|
| Polyethylene | 85% to 91% |
| Vinyl acetate | 9% to 15% |

The thermoplastic elastomeric composition may have the following composition:

| | |
|---|---|
| Polypropylene or polyolefin | 20% to 60% |
| Styrene butadiene styrene | 40% to 80% |

A preferred composition of the ethylene vinyl acetate composition comprises:

| | |
|---|---|
| Polyethylene | 88% |
| Vinyl acetate | 12% |

The amount of antioxidant lubricants and colorants may be used as required Antioxidant are normally added to facilitate regrind and reuse of the plastic Lubricants are adhered to be used as release agents in molding the plastic closure.

Excellent results have been achieved in tests wherein the percentage of ethylene vinyl acetate composition and percentage of thermoplastic elastomeric composition comprise 80%-20%; 75%-25%; and 70%-30%. It has been found that compositions made in accordance with the invention can be consistently extruded, cut and compression molded in a plastic closure. It has been further found that the sealing liner in such a closure satisfactorily provides a seal with optimal removal torque characteristics on both plastic and glass containers.

Satisfactory results have been achieved in meeting closure requirements including satisfactory removal torques, carbonation retention, carbonation retention under top load and satisfactory functioning on a container when cycled through environmental changes of temperature and humidity.

It can thus be seen that there has been provided a compression molded sealing liner which will overcome the problems inherent in the prior sealing liners; which will operate satisfactorily on both plastic and glass containers; which is relatively lower in cost; and which can be readily processed and meet the requirements for a satisfactory closure.

I claim:

1. A plastic closure comprising
a base wall, a peripheral skirt, means on said skirt adapted to attach the closure to a container, and
a sealing liner compression molded in situ on the interior of the base wall of the closure, said sealing liner comprising a blend of an ethylene vinyl acetate composition and a thermoplastic elastomeric composition, said ethylene vinyl acetate composition comprises at least 70% of the liner composition, said closure operating satisfactorily on both plastic and glass containers.

2. The closure set forth in claim 1 wherein the ethylene vinyl acetate composition comprises polyethylene as the major constituent and vinyl acetate.

3. The closure set forth in claim 2, wherein said vinyl acetate comprises 9-15% of the ethylene vinyl acetate composition.

4. The closure set forth in claim 3, wherein the vinyl acetate comprises 12% of the ethylene vinyl- acetate composition.

5. The closure set forth in claim 1 wherein the ethylene vinyl acetate composition comprises about 70% to 80% and the thermoplastic elastomeric composition comprises 20% to 30%.

6. The closure set forth in any of claims 1-5 wherein said thermoplastic elastomeric composition comprises an olefin and styrene butadiene styrene.

7. The closure set forth in any of claims 1-5 wherein said ethylene vinyl acetate composition and said thermoplastic olefin composition comprise antioxidants and coloring pigments.

* * * * *